United States Patent [19]

Kurtz

[11] Patent Number: 4,766,763
[45] Date of Patent: Aug. 30, 1988

[54] GAS LEAK DETECTION APPARATUS AND METHODS

[75] Inventor: Anthony D. Kurtz, Teaneck, N.J.

[73] Assignee: Kulite Semiconductor Products, Inc., Leonia, N.J.

[21] Appl. No.: 46,167

[22] Filed: May 5, 1987

[51] Int. Cl.4 ............................................. G01M 3/26
[52] U.S. Cl. ........................................ 73/49.2; 73/40
[58] Field of Search ................. 73/49.2, 49.3, 40, 708; 338/3, 4, 8, 9, 13

[56] References Cited

U.S. PATENT DOCUMENTS

| | | | |
|---|---|---|---|
| 2,924,965 | 2/1960 | Westerheim | 73/40 |
| 3,012,432 | 12/1961 | Moore et al. | 73/40 |
| 3,978,710 | 9/1976 | Ratajski | 73/49.3 |
| 4,480,478 | 11/1984 | Sato et al. | 73/708 |
| 4,556,807 | 12/1985 | Yamada et al. | 338/3 |
| 4,604,899 | 8/1986 | Yamada et al. | 73/708 |
| 4,667,516 | 5/1987 | Schulz | 73/708 |

Primary Examiner—Stewart J. Levy
Assistant Examiner—Hezron E. Williams
Attorney, Agent, or Firm—Arthur L. Plevy

[57] ABSTRACT

There is disclosed a gas leak detector employing pressure transducers. In one embodiment the pressure in a vessel is monitored by means of a pressure transducer. The output of the pressure transducer is coupled to an operational amplifier whereby the amplifier has a gain which is proportional to 1/T absolute. In this manner, since the gain is inversely proportional to temperature, the amplifier will produce an output which is independent of temperature but which is capable of providing a pressure indication when there is a gas leak in the container.

2 Claims, 2 Drawing Sheets

GAS LEAK DETECTION APPARATUS AND METHODS

BACKGROUND OF THE INVENTION

This invention relates to a gas leak detector apparatus and more particularly to a technique and apparatus for detecting gas leaks utilizing pressure transducers.

As is well known, at normal pressures and temperatures, the pressure of a gas is given by the ideal gas law $PV = NRT$ where V is the volume occupied by N moles of the gas, P stands for pressure, R is the universal gas constant and T is the absolute temperature. As is known, a mole equals $6 \times 10^{23}$ molecules of any substance.

There are many texts and articles existing in the prior art regarding theories of gas and the equation governing gas behavior. The ideal gas law is indicated above. One can of course understand that there is a need to determine whether or not there is a leak in a particular container or vessel which contains gas. The so-called leak detector is an extremely important device especially when one is dealing with obnoxious or poisonous gases as well as certain types of gases which are combustable or highly dangerous. It is, therefore, apparent that one needs a device which will detect a leak in a container.

Such a device should provide one with an accurate representation of the magnitude of the leak as well as the intensity of the same in regard to the escape of gas so that suitable alarms or suitable warnings can be given or that the overall amount or number of molecules or moles of the gas in the vessel can otherwise be ascertained.

Essentially, as indicated above, the concentration of combustable gases, for example, must be determined and controlled in manufacturing operations and other industrial situations for several reasons. These include safety reasons to avoid explosions by maintaining concentrations well below the lower explosive limit and also to avoid the toxic effects of most combustable gases on operating personnel. There is further concern regarding processing efficiency, and therefore one must maintain optimum concentrations for combustion and other chemical reactions where such gases may be used as well as for detection of faulty operating equipment and procedures.

In any event, the prior art is replete with a number of gas analyzers which all serve to monitor the concentration of gases. A very common device used employs a self-heated hot wire detector which is usually made of platinum. The wire also serves as a combustion catalyst, and where the combustable gas to be measured also contains air the mixture is fed to a hot wire detector whereupon combustion occurs. A temperature sensor such as a thermocouple may detect a temperature rise and this in turn is a measure of the concentration of the gas. More frequently, the electrical resistance of the hot wire itself is measured as the means for detecting temperature rise much as occurs in a typical electrical resistance thermometer. Where the sample does not contain an excess of oxygen then air or oxygen must be added to the sample in carefully controlled quantities but added well in excess of combustion requirements so that the reaction occuring within the detector will be limited only by the amount of combustable gases or vapors present.

Wheatstone bridge circuitry is generally used in these instruments. In any event, where a bridge circuit is used, the reference detector is also required. The reference gas may be air or the sample gas also may be used for these purposes. In other types of gas analyzers, the sample gas is burned in a small pilot flame where the temperature is detected by a thermocouple. The presence of combustables in the supply of gas to the pilot causes the flame temperature to increase proportionately with concentration. There are gas analyzers which are called thermal conductivity types, as different gases vary considereably in their ability to conduct heat. Such devices use hot wire gas analyzer cells where a typical cell is comprised of an electrically conductive elongated sensing element that is mounted coaxial inside a cylindrical chamber which contains the gas. By passage of an electrical current through the element, the cell is maintained at a temperature considerably higher than the cell wall. The equilibrium temperature is reached when all thermal losses from the wire are equalized by the electric power input to the element.

The difference of temperature between the element and the cell walls reflected by the temperature rise of the element at equilibrium is a function of electric power input and combined rate of heat loss from the wire by gaseous conduction, convection, radiation and conduction through the solid parts of the element. Thus proper cell design and geometry makes it possible to maximize the heat loss due to gaseous conduction. Thus a rise in the temperature of the element at constant electric power input is inversely related to the thermal conductivity of the gas within the cell. Normally, a Wheatstone bridge is used to measure resistance change of the sensing element.

In any event, suffice it to say, that there are many techniques employed in the prior art which essentially serve to monitor the concentrating of gases. Such techniques can of course be employed to determine whether or not a vessel containing a gas is subjected to a leak by knowing what the number of molecules are.

As one can see from the ideal gas law, changes in temperature result in changes in pressure and so on. Many of the prior art devices, as indicated above, suffer in that they are very complicated or require multiple components and are normally difficult to monitor and to utilize.

It is, therefore, an object of the present invention to provide and improved gas detecting apparatus which is simple and inexpensive to maintain or operate. It is a further object of the present invention to provide a gas leak detector apparatus, which utilizes a pressure transducer in a reliable and efficient manner, to determine any change in N, the number of moles of gas in a container.

BRIEF DESCRIPTION OF THE PREFERRED EMBODIMENT

A gas leak detector apparatus for detecting a gas leak in a gas containing vessel of a given volume, comprising pressure transducer means including a deflectable diaphragm located in said vessel and responsive to the pressure exerted by said gas contained in said vessel, means coupled to said pressure transducer means and responsive to the temperature of said gas in said vessel to cause said transducer means to provide a fixed output proportional to P/T and strictly according to the number of moles in said vessel whereby if there is a leak in said vessel said transducer will provide an output indicative of the same.

DETAILED DESCRIPTION OF THE FIGURES

Figure 1:
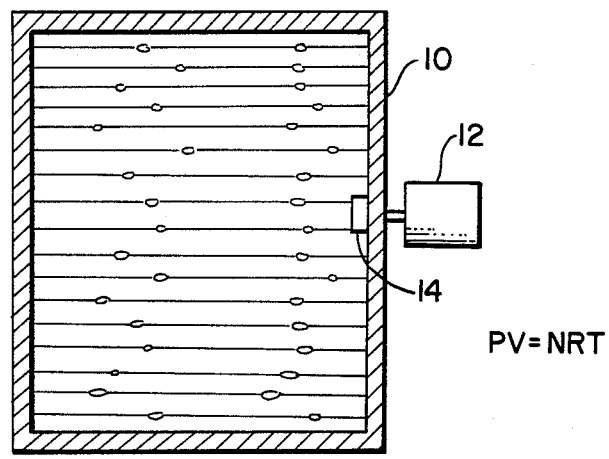
FIG. 1 is a schematic view of a vessel containing a gas leak detector according to this invention.

Referring to FIG. 1, there is shown a vessel 10 containing a predetermined number of moles of gas 11. The quantity or number of moles of the gas 11 is monitored by the apparatus to be described and generally designated as 14, which apparatus may be coupled to some external device 12 such as an alarm device, a gage or any other device in order to enable one to determine whether or not there is a leak in the container of gas.

Shown to the right of the vessel 10 is the ideal gas equation indicated above where PV=NRT. Basically, gas is a state of matter in which the molecules move freely, and consequently, the entire mass tends to expand indefinitely occupying the total volume of any vessel 10 into which it is introduced. Gases, as indicated, within a considerable degree of fidelity follow the gas law relating to conditions of pressure, volume and temperature as indicated by the ideal gas equation which is shown to the right of the vessel 10. It is understood that when temperature is referred to in this application, it is always absolute temperature.

In any event, in order to utlilize a gas leak detector mainly employing pressure transducers, one must make sure that the subject pressure transducer or accompanying circuitry is insensitive to normal pressure changes of the gas temperature changes, i.e. P/T changes must be constant for a fixed volume if N does not change.

Figure 2:
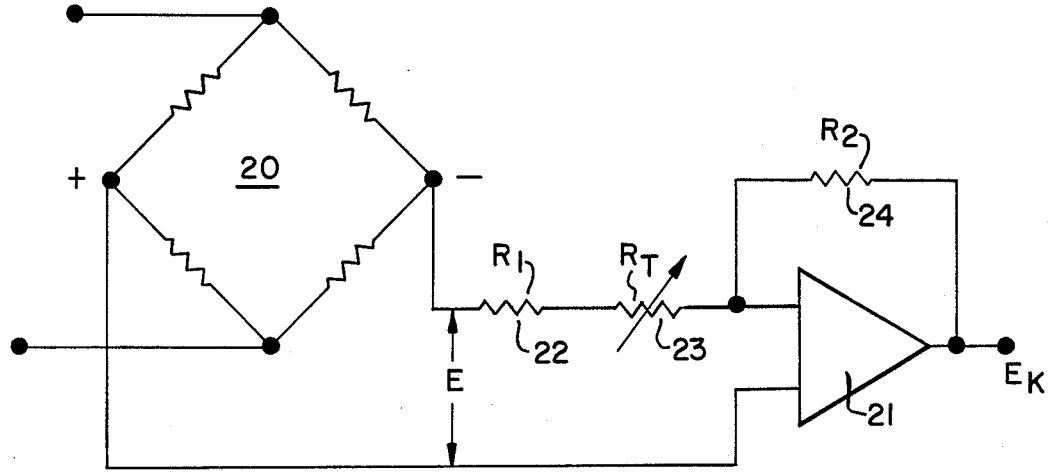
FIG. 2 is a detailed schematic view of a gas leak detector apparatus employing a pressure transducer and an operational amplifier to provide gas leak detection.

Referring to FIG. 2, there is shown one embodiment of a gas leak detector employing a pressure transducer. In FIG. 2, the pressure transducer designated by reference numeral 20 is shown as a Wheatstone bridge configuration. The Wheatstone bridge is a typical configuration employed for pressure transducers. Pressure tranducers are generally available and may employ peizoresistive elements which essentially monitor pressure or force applied to a deflectable diaphragm. Such pressure transducers have been widely employed in the prior art and are the subject matter of many patents. An example of suitable pressure transducers which can be employed may be had by referring to U.S. Pat. No. 4,236,137 entitled SEMICONDUCTOR TRANSDUCERS EMPLOLYING FLEXURE FRAMES issued on Nov. 26, 1980 to A. D. Kurtz, et al and assigned to the assignee herein.

In any event, an ideal tranducer as 20 has a voltage output E which is proportional to the applied pressure P according to E =SP. In the equation S is a sensitivity constant which is a function of the particular pressure transducer being employed. As one can ascertain, if the pressure measured is due to an ideal gas sealed in a container of fixed volume such as the container 10 of FIG. 1 then the ideal gas law applies where PV=NRT. As one can see, the container as 10 of FIG. 1 is filled initially to a pressure $P_O$ at absolute room temperature $T_O$ with $N_O$ moles of gas. At some later time if a leak has occurred then the number of moles of gas has changed to N.

A convenient method of effecting compensation for E is done in conjunction with an amplifier whose gain K is compensated for temperature induced gas pressure changes for the amplified signal $E_K$.

Referring to FIG. 2, there is shown an operational amplifier which essentially operates to provide a gain K proportional to 1/T. As one can see from FIG. 2, the Wheatstone bridge has its inputs connected to the inverting and non-inverting terminals of the operational amplifier 21. Essentially, the operational amplifier 21 is a conventional device which can be purchased as an integrated circuit and available from many sources.

As is well known, the gain of an operational amplifier essentially is equal to the feedback resistor as $R_2$ divided by the input resistance as $R_1+R_T$, where $R_1$ and $R_2$ are fixed resistors and $R_T$ is a temperature varying resistor. Hence by selecting these resistors, one can obtain a gain K from the operational amplifier 21 which is inversly proportional to the absolute temperature. In this manner, the gain of the operational amplifier varies desirably a 1/T absolute for a complete range of temperature and essentially is independent of pressure.

In this manner, one can immediately ascertain the number of moles in the vessel or ascertain the change in the number of moles in the vessel if a leak occurs due to the fact that the gain of the operational amplilfier varies inversely as temperature, and hence any pressure change which occurs due to the leak of molecules from the sealed vessel becomes a pure function of pressure and not temperature, as one can immediately ascertain from the above description.

Thus, in regard to FIG. 2, one again considers the case of the transducer 20 which monitors the gas pressure in the sealed container as container 10 of FIG. 1. The pressure will vary as the absolute temperature T in accordance with the perfect gas law. Therefore, the transducer output will vary with temperature so that any change in output indicates a loss of gas due to a leak in the container.

As seen from the FIG. 2, the transducer which is a Wheatstone bridge configuration has an output voltage designated as E. The operational amplifier has an input impedance consisting of the series resistor combination of resistor 22 in series with resistor 23 also designated as $R_1$ plus $R_T$. The feedback resistor designated as $R_2$ is indicated by reference numeral 24. As one can ascertain, both resistors 22 and 24 are temperature independent while resistor 23 exhibits a linear temperature change with a temperature coefficient TCR designated as $\alpha_T$. As one can immediately ascertain, the output voltage of the opamp circuit, designated as $E_K$, is given by:

$$E_K = KE$$

where K is the circuit gain, related to the resistor elements as:

$$K = \frac{R_2}{R_1 + R_T}$$

Now the transducer output E and the temperature sensor $R_T$ vary with temperature as:

$$E = E_O\left(\frac{T}{T_O}\right) = E_O\left(1 + \frac{\Delta T}{T_O}\right)$$

$$R_T = R_{TO}(1 + \alpha_T \Delta T)$$

Where
$T_o$=absolute reference temperature ($T_o$=600° F. at room ambient)
$\Delta T = T - T_O$ is any change from $T_O$
$E_O$=Transducer output voltage at $T=T_O$
$R_{TO}$=Sensor resistance at $T=T_O$
$\Delta_T$=TCR of the temperature sensor
The gain K can now be expressed as:

$$K = \frac{K_O}{1 + x\Delta T}$$

where $$K_o = \frac{R_2}{R_1 + R_{TO}}$$

is the gain at $T=T_o$.

$$x = \frac{R_{TO}\alpha_T}{R_{TO} + R_1}$$

is the effective temp coefficient of the gain. Since the transducer output varies as $$\left(1 + \frac{\Delta T}{T_O}\right)$$

then an exact compensation of this change will occur if:

$$X = \frac{R_{TO}\alpha_T}{R_{TO} + R_1} = \frac{1}{T_O}$$

Given the sensor characteristics $R_{To}$ and $\Delta_T$ and some nominal value of gain $K_o$, the resistors $R_1$ and $R_2$ are chosen as follows:

$$R_1 = R_{TO}(\Delta_T T_O - 1)$$

$$R_2 = K_O R_{TO} \Delta_T T_O$$

Typically $R_{TO}$=1000 Ω, $\Delta_T$=35%/100 F=0.0035/°F. and $T_O$=600° F. $R_1$ is then computed to be 1100Ω.

The resistors such as $R_2$ and $R_1$ are conventional components and as indicated above can be selected according to the particular type of pressure transducer employed.

As one can immediately ascertain, all of the components can be implemented with conventional integrated circuits with the exception of the variable resistor or composite resistor consisting of resistors 22 and 23, which components are available from many sources. Temperature sensitive resistors as one can ascertain are well known in the prior art and the values as well as operation over a given temperature range is also well known.

It is of course understood that one can also achieve an output from a transducer which varies as 1/T by shunting the sensor bridge with a temperature sensitive resistor employed in a voltage divider. The mathematical description afforded is by way of example only and there are many techniques known to provide a transducer output having a gain factor which varies as 1/T.

Figure 3:
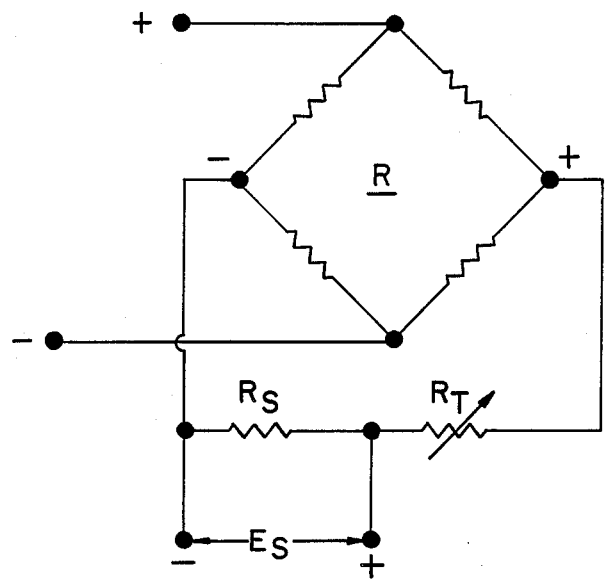
FIG. 3 is a schematic view depicting a pressure transducer circuit in conjunction with a temperature sensitive resistor divider to provide gas leak detection.

Referring to FIG. 3, a voltage divider consisting of a fixed resistor $R_S$ and a linear temperature sensor $R_T$ is put in parallel with the transducer bridge output whose resistance is R. If the bridge output voltage is E then the voltage across $R_S$ is given by:

$$E_S = E\left(\frac{R_S}{R_S + R_T + R}\right)$$

As before, the temperature dependence of E, R and $R_T$ can be expressed as:

$$E = E_O\left(1 + \frac{\Delta T}{T_O}\right)$$

$$R_T = R_{TO}(1 + \alpha_T \Delta T)$$

$$R = R_O(1 + \alpha \Delta T)$$

where $\alpha_T$ is the TCR of the temperature sensor, $\alpha$ is the TCR of the bridge resistance, $\Delta T$ is a change in temperature from the reference temperature $T_o$. $E_S$ is now written in the form:

$$E_S = \frac{E_{SO}\left(1 + \frac{\Delta T}{T_O}\right)}{(1 + x\Delta T)}$$

$$E_{SO} = \frac{E_O R_S}{R_S + R_{TO} + R_O}$$

$$x = \frac{R_{TO}\alpha_T + R_O\alpha}{R_S + R_{TO} + R_O}$$

To achieve exact compensation of the gas temperature effect we require that $xT_O$=1, in which case $R_S$ is:

$$R_S = R_{TO}(\alpha_T T_O - 1) + R_O(\alpha T_O - 1)$$

Typically $R_O$=500Ω, $\alpha$=10%/100F, $R_{TO}$=10,000Ω, $\alpha_T$=35%/100F and $T_O$=600° F. With these values $R_S$10,800Ω and $E_S$=0.507 $E_O$.

Figure 4:
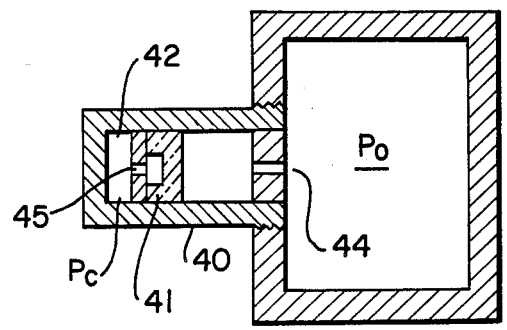
FIG. 4 is a cross sectional view of a pressure transducer which can serve as a leak detector according to the principles of this invention.

Referring to FIG. 4, there is shown a pressure transducer which essentially will produce a voltage output completely insensitive to gas temperature changes without utilizing the operational amplifier configuration as shown in FIG. 2 or any other temperature varying resistors. Essentially, the pressure sensor includes a housing 40 which has a first section including a pressure port 44. Positioned in the port 44 is a deflectable diaphragm 41 containing a differential pressure sensor on the surface. As one can see for example, the pressure sensor 41 is of a U-shaped type, many examples of which have been described in the literature. See for example, some of the patents cited above for semiconductor pressure transducers which employ U-shaped housing configurations. As one can see, the pressure sensor 41 which is a semiconductor device has disposed on a top surface thereof a peizoresistive array configuration which essentially is responsive to pressure. The top side of the diaphragm would receive an input pressure such as $P_O$ as is well known. Also shown is an aperture 45 which communicates with the under side of the pressure diaphragm associated with the pressure sensor 41. The aperture 45 extends into a reference cavity 42. The reference cavity 42 is filled with an inert gas such as nitrogen and is sealed at a predetermined pressure such as $P_C$ at some fixed temperature. As one can immediately ascertain, the entire tranducer could be placed in a vessel such as 10. In this manner, both the reference chamber 42 as well as the external port to which the pressure $P_O$ is exerted as for example the chamber 44 are both subjected to the same exact temperature. In general $P_C$, the pressure in reference cavity 42 at standard temperature is picked to be the same as the pressure $P_O$ in the chamber 44 at the same standard temperature.

In this manner, the effects of gas temperature causing pressure changes are balanced out due to the fact that both chambers 42 and 44 are subjected to the same temperature and as the temperature changes both presusres, i.e., in chambers 42 and 44 are the same.

As one can immediately see from FIG. 4, the reference chamber 42 contains nitrogen or some other inert gas at a fixed known pressure $P_C$. As both reference chamber and the chamber 44 are heated or cooled, pressure in each will change in a completely tracking manner and no differential pressure will exist across the sensor diaphragm due to the fact that the sensor 41 is subjected to pressure $P_O$ via cavity 44 and is subjected to $P_C$ via the reference chamber 42 and due to the aperture 45. If there is a leak in the vessel then the pressure due to $P_O$ will change resulting in a differential pressure across the pressure tranducer. This pressure difference will be sensed directly by the sensing elements associated with the transducer structure 41, and essentially the voltage output between the reference pressure of cavity 42 and in regard to the pressure $P_O$ which is operating on the top surface of transducer 41. In this manner, the transducing element 41 will provide a pressure output which is strictly related to the difference in the number of moles in the container.

Since at a given temperature, the pressure $P_O$ will vary if there is a leak in the vessel and the pressure $P_C$ in the reference chamber 42 will not vary, there will be a pressure differential across the diaphragm which only can be caused by the loss of mole or molecules of gas in the vessel. Hence the output of the transducer is independent of temperature as long as there is no leak in the vessel. As soon as a leak occurs, there is a pressure differential which results in an output from the transducer structure which is directly proportional to the pressure differential.

Such transducers structures for example as shown in FIG. 4 are know in the prior art and many examples of such structures exist. In any event, it is the main aspect of the present invention to produce a sealed reference chamber 42 which chamber is then filled with an enert gas such as nitrogen at a predetermined pressure and is thereby utilized as a reference pressure for a pressure transducer having applied that predetermined pressure to one diaphragm surface whereby the other diaphragm surface of the transducer will receive the actual pressure as contained within the vessel containing the gas such as vessel 10 on FIG. 1.

It is, therefore, apparent that a gas leak detector utilizing presssure tranducers can be implemented by both electrical and mechanical means as shown for example in FIG. 2 and FIG. 4. It will also be apparent to those skilled in the art that there are many alternate embodiments which will not depart from the spirit and scope of the above-noted structures or apparatus all of which are deemed to be encompassed within the breadth and scope of this invetion and as further defined as the claims appended hereto.

What is claimed is:

1. A gas leak detector apparatus for detecting a gas leak in a gas containing vessel of a given volume, comprising:
   a pressure transducer of the type having a deflectable diaphragm, wherein said pressure transducer includes a full Wheatstone bridge array mounted on said diaphragm and having one or more pressure responsive resistors forming said array for providing at an output a voltage proportional to a net force applied to said diaphragm, said bridge array having a first and a second output terminal;
   an operational amplifier having a gain proportional to 1/T where T is the absolute temperature of said gas, said operational amplifier having a first input coupled to said first bridge array output terminal and a second input coupled to said second bridge array output terminal, with one input of said operational amplifier in series with a resistive circuit having a resistance value which varies with temperature to provide at an output of said amplifier a voltage which varies inversely with temperature according to 1/T whereby the gain of said amplifier is inversely proportional to the absolute temperature of said vessel so that said output of said amplifier is responsive solely to the number of moles of gas in said vessel and independent of the temperature to thereby provide an output only when the amount of gas in said vessel changes indicative of a gas leak.

2. The gas leak detector apparatus according to claim 1, wherein said operational amplifier includes a feedback resistor between said output terminal and inverting input terminal.

* * * * *